3,249,457
FLOCKED ARTICLE AND METHOD OF MANUFACTURE
John E. Lynch, Emerson, N.J., assignor to Interchemical Corporation, New York, N.Y., a corporation of Ohio
No Drawing. Filed Sept. 28, 1962, Ser. No. 227,090
2 Claims. (Cl. 117—25)

This invention relates to flocked articles having excellent resistance to flexing, washing, and drycleaning, good hand, and outstanding wet crock resistance, and to the process for making them.

In the application of flock adhesive to textiles by gravure printing, the types of compositions that can be used are greatly restricted by the requirements of the method. Hitherto the most commonly used adhesives for gravure application have been based on alkyd resins, especially long-oil alkyds with considerable admixture of pigments and extenders. They have good printing qualities, good wash and drycleaning resistance, but their hand is very poor, and their wet crock resistance is not too good. On the other hand, solutions of elastomers are low in solids and their printing qualities are poor for applying to textiles by the gravure systems.

It has now been found that the objectionable features of these prior art flock adhesives can be eliminated while retaining the latter's desirable properties. This invention provides an aqueous system based on an acrylic melamine composition in combination with an acrylic latex. The adhesive may be applied by various known methods including gravure printing. When the material is flocked and the adhesive cured, the completed article has very good perchloroethylene resistance, very good flexibility and good wash resistance. In all these respects it is the equivalent of good commercially available flock adhesives. In contrast to the latter, however, it shows great superiority in wet rub resistance with water, also known as wet crock resistance (with water). The flocked articles after 175 hours in the Fade-Ometer showed no change.

The adhesive is composed of a mixture in about 50/50 weight ratio of polymeric compositions A and B described below. The parts are parts by weight.

Composition A 85 parts of butyl acrylate and 15 parts of acrylic acid were polymerized in refluxing dioxane. The monomers were added slowly with 0.2 part of n-butyl mercaptan and 2% of di-tertiary-butyl peroxide, the addition being made over a 2-hour period, the temperature rising to 120° C. After the batch had been heated one hour more, it was cooled and 2 equivalents of ammonia added. Finally the solids content was adjusted to 50% with water. 7 parts of this product were combined with 3 parts of the hexamethyl ether of hexamethylol melamine.

Composition B

Following conventional procedure an aqueous dispersion (latex) was made with an interpolymer of 70–78 parts of ethyl acrylate, 15–16 parts of methyl methacrylate, 2–6 parts of methacrylic acid or itaconic acid. The solids content was 46%.

50 parts of B were added slowly to 50 parts of A while stirring with a high speed mixer. The composition was cured by heating one hour at 250° F., for example, after application to a suitable substrate and flocking.

Comparisons were made with flocked articles whose adhesive was a good commercial product based on neoprene. For the tests, the adhesives were knife-coated on 80 x 80 cotton fabric. Flock was applied using a modified beater bar, the samples cured at the required schedule and then air dried 24 hours prior to testing. The lowest film thickness that gave satisfactory flock acceptance and adhesion was used. Flock adhesion was determined by abrasion with the fingernail.

No. 3 wash test was carried out by loading a test piece in a mason jar with 100 cc. of New York city tap water, 0.5% of soap ("Lux"), 0.2% sodium carbonate, and 10 steel balls. The jar was run 45 minutes at 160° F. in the Launder-O-meter. Samples were inspected for flock removal immediately after the test and adhesion tests were made after the samples had dried.

Perchloroethylene resistance was measured also in a mason jar, the charge being a test strip, 100 cc. of perchloroethylene, and 20 steel balls. The jar was run 15 minutes at 115° F. in the Launder-O-meter. Flock removal and adhesion were evaluated as in the wash test.

Resistance to ultraviolet light was determined in the Fade-Ometer in the usual way.

The steel balls used in the tests may have a diameter of about $3/16''$ to about $1/4''$.

Wet crock, or wet rub resistance was determined in the Crockmeter.

Testing for hand was done one day after removal from the test jars.

The outstanding difference between the flocked articles prepared according to this invention and prior art ones was displayed in the wet crock resistance, the prior art flocked articles failing at 125 and 190 rubs respectively, while the flocked articles prepared with the adhesives of this invention showed slight wear only after 1000 rubs.

In the claims parts are parts by weight.

What is claimed is:
1. An article having a flocked surface, the adhesion of the flock being due to a cured adhesive which comprises, before curing, a latex containing in the dispersed phase an interpolymer of 70–78 parts ethyl acrylate, 15–16 parts methyl methacrylate, and 2–6 parts of an acid selected from the group consisting of methacrylic acid and itaconic acid and in the continuous phase the ammonium salt of a copolymer of about 85 parts butyl acrylate and about 15 parts acrylic acid and also the hexamethyl ether of hexamethylol melamine, the total solids being about 50% by weight and being about equally divided between the dispersed phase and the continuous phase, the ratio of the acrylic polymer in the continuous phase to said melamine compound being about 7:3.

2. The process of making a flocked article by (a) applying by means of gravure printing to at least one surface of an article an adhesive comprising a latex containing in the dispersed phase an interpolymer of 70–78 parts ethyl acrylate, 15–16 parts methyl methacrylate, and 2–6 parts of an acid selected from the group consisting of methacrylic acid and itaconic acid and in the continuous phase the ammonium salt of a copolymer of about 85 parts butyl acrylate and about 15 parts acrylic acid and also containing in the continuous phase the hexamethyl ether of hexamethylol melamine, the total solids being about 50% by weight and being about equally divided between the dispersed phase and the continuous phase, the ratio of the acrylic polymer in the continuous phase to said melamine compound being about 7:3, (b) applying flock to the adhesive, and (c) curing the adhesive.

References Cited by the Examiner
UNITED STATES PATENTS

| | | | |
|---|---|---|---|
| 2,311,850 | 2/1943 | Mantell | 117—33 |
| 2,906,724 | 9/1959 | Daniel | 260—856 |
| 2,976,167 | 3/1961 | Maeder et al. | 117—33 |

WILLIAM D. MARTIN, *Primary Examiner.*

S. W. ROTHSTEIN, *Assistant Examiner.*